Jan. 12, 1937. O. RÖHM 2,067,580
METHOD OF POLYMERIZING ORGANIC COMPOUNDS
Filed Oct. 16, 1934
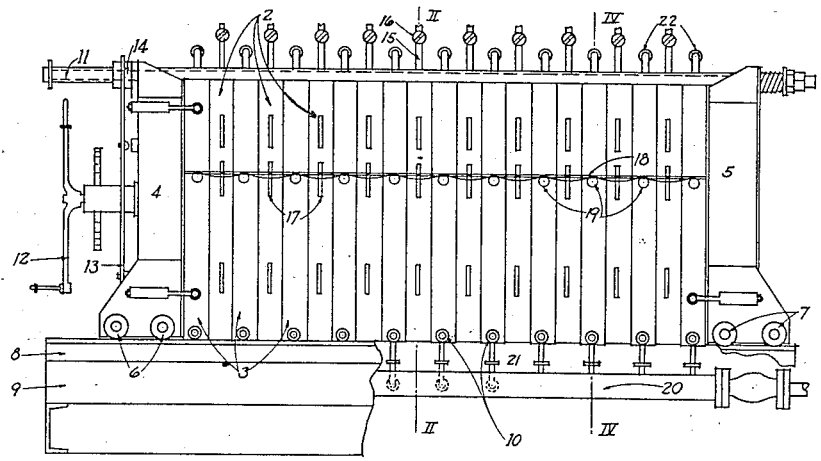
FIG. 1
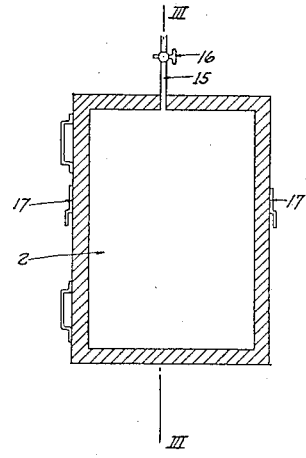  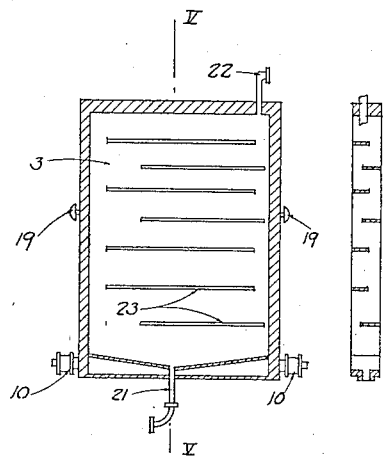 
FIG 2    FIG 3         FIG 4    FIG 5
INVENTOR.
Otto Röhm
BY
Robert W Englehart
ATTORNEY.

Patented Jan. 12, 1937

2,067,580

UNITED STATES PATENT OFFICE 2,067,580

METHOD OF POLYMERIZING ORGANIC COMPOUNDS

Otto Röhm, Darmstadt, Germany, assignor to Röhm & Haas Company, Philadelphia, Pa., a corporation of Pennsylvania Application October 16, 1934, Serial No. 748,471 In Germany October 9, 1933

6 Claims. (Cl. 18—55)

This invention relates to a method for converting liquid materials or mixtures, which are capable of polymerizing or condensing, into solid or semi-solid materials.

It relates more particularly to a method for converting such liquids into solids in such a manner that thick slabs of the polymerizate or condensate can be made without the danger of having bubbles in the finished product. This is of great importance if the final product is to be used as a glass substitute or in the preparation of films, particularly those used as intermediate layers in non-shatterable or laminated glass.

Many polymerization and condensation products tend to develop gas or vapor during the process of polymerization or condensation and unless special methods and extreme care are used in their manufacture, such bubbles will remain in the finished product and thus render it unfit for practically all of its uses. This is true of polymerizable, unsaturated organic compounds which may be converted to solid or semi-solid materials by heating, with or without the addition of catalysts, especially when slabs having a thickness of one centimeter or more are prepared. Sheets or films up to two or three millimeters thick can be made free of bubbles without a great deal of difficulty if the monomeric material is poured into a shallow pan and heated to the proper temperature, the pan being covered so as to prevent loss by evaporation. For thicker slabs this method is unsuitable and practically always gives rise to bubbles due to the fact that the entire mass of the material undergoing polymerization cannot be uniformly heated. Local overheating is almost certain to occur, the result of which is excessive bubble formation.

It is an object of this invention to provide a method and apparatus for carrying out the method by which thick slabs of polymerized material may be easily made, the finished product being free of detrimental bubbles.

It has been found that if the process is carried out in narrow preferably vertical chambers or cells of suitable dimensions, slabs of any desired thickness up to one centimeter or more can be readily made without danger of forming bubbles in the finished product. Such cells have two surfaces of large area both of which can be exposed simultaneously to the heating medium, thus insuring uniform heating of the contents. In this way all local over-heating with its consequent bubble formation is eliminated.

The cells are made of metal and may be heated by conducting warm air or liquid in contact with the large surfaces. Thus the temperature of the material within the cell may be accurately regulated since the heating medium will not only conduct heat to the material undergoing polymerization, but will also conduct away any heat generated by an exothermic process of polymerization or condensation.

These cells may be as long and as deep as necessary for the purpose. The width, however, will be determined by the thickness of the slab desired but is limited by the fact that if the width is too great a smooth and uniform polymerization cannot be guaranteed. It has been found that slabs one centimeter thick can be easily made without any difficulty and without the formation of any bubbles. In many cases thicker slabs can be made. The maximal and optimal thickness can be readily determined experimentally for any given material.

In carrying out the invention the liquid to be polymerized is poured into the cell, the top closed and the entire cell and contents exposed to the heating medium. It is raised to the desired temperature and held at that point until the polymerization is completed.

It is advantageous to arrange several cells in a single system with heating units in alternate position between them. The heating units are in contact with the cells throughout the entire area of both large surfaces of the cell so that uniform heating is attained. The heating units are so arranged that the heating medium, a warm gas or liquid, can be circulated through them thus permitting accurate control of the temperature. Liquids are preferred for the heating medium because their temperature can be easily regulated and the transfer of heat to or from the material in the cell is rapid enough so that proper control of the temperature is facilitated.

If for instance it is desired to carry out the process at 70° C., the heating liquid is raised to that temperature or slightly higher and circulated through the heating units until the material within the cell is also at 70° C. In case the reaction is exothermic the heat developed within the cell may be removed by lowering the temperature of the circulating liquid to the point where the heat generated is exactly sufficient to maintain the contents of the cell at 70° C.

A suitable arrangement of the cells and heating units for carrying out this process is shown in the accompanying drawing in which:

Figure 1 is a side elevation;

Figure 2 a cross-section through one of the cells on line II—II of Figure 1;

Figure 3 a cross-section on line III—III of Figure 2;

Figure 4 a cross-section of a heating unit on line IV—IV of Figure 1;

Figure 5 a cross-section on line V—V of Figure 4.

Referring to the drawing the cells 2 are placed alternately with the heating units 3, in a screw press having head and tail pieces 4 and 5 respectively. The head and tail pieces are mounted on rollers 6 and 7 which run on a rail 8, which in turn is mounted on any suitable bedplate 9. The heating units are also equipped with rollers 10, which also run on the rail 8. The elements of the press are drawn tightly together by means of screws 11, shown only at the top of the press, which are operated by the lever 12, and chain 13 by turning a nut 14 on the screw 11.

Each cell 2, has a nipple 15 and stopcock 16 through which it may be filled with the material to be polymerized. Hangers 17 are also provided to support the cells. These hangers fit on the rod 18 which rests on the lugs 19 attached to the heating units.

The heating units are flexibly connected to an inlet manifold 20 by means of the pipes 21 and to an outlet manifold (not shown) by the pipes 22. The heating units have baffles 23 which force the heating liquid to flow in the proper channels, thus insuring uniform heating over the entire surface of the unit.

The cells may consist of a simple frame which when suspended between the heating units form the cell. This is the simplest form and permits the easy removal of the slab from the cell after the polymerization is complete. The cells may also be complete in themselves with permanent walls and removable top and bottom. These may be filled and inserted between heating units. After the polymerization is complete the cell is removed from the press. The top and bottom of the cell are then removed and the slab pushed out by means of a flat piston or by any other convenient method.

In some cases it is advantageous to maintain a superatmospheric pressure on the liquid during the polymerization process. This can be done by connecting the filling pipes 15 to a header and maintaining the desired pressure in the header. In cases where a considerable contraction in volume takes place during the polymerization or condensation process, this is of decided advantage for insuring complete filling of the cell with the consequent production of a perfect slab.

The cells may have any desired shape, square, round, oval, etc. Rods of any desired cross-section may also be made in the same way by fluting the surfaces of the heating units so as to correspond to the shape of the rod. In this case it may be possible to dispense with the frames and close the heating units tightly together, the fluting in the heating units then forming molds for the rods.

In operating this process the cells and heating units are assembled and forced tightly together so as to make liquid-tight joints between them. The cells are then filled with the liquid to be polymerized and the heating medium started circulating through the heating units. This is preferably done by means of a pump (not shown) and the temperature of the liquid may be adjusted by any convenient means.

The temperature is then maintained at the proper point for the time necessary to complete the polymerization. The press is then cooled, opened, the cells taken out and the slab of polymerized material removed.

Many materials, particularly liquids capable of undergoing polymerization can be processed in this apparatus. In particular unsaturated organic compounds or mixtures of such compounds can be easily converted by heat into solid or semi-solid material in the form of slabs, rods, etc. which are entirely free of bubbles and which are uniformly polymerized throughout. If desired plasticizers, coloring material, etc., may be added to the monomeric material before pouring it into the cell and catalysts such as benzoyl peroxide may also be used. Suitable materials capable of being polymerized in this manner are the esters of acrylic and methacrylic acids, vinyl acetate, styrol, etc. The monomeric material may also be freed of any dissolved gases before or after pouring into the cells. This may be done by any well known method such as boiling or subjecting the liquid to reduced pressure.

The following examples will illustrate the process but are not intended to limit it since other liquid materials capable of being hardened by heat may be used in place of those shown in the examples:

*Example 1.*—Sixty parts of ethyl methacrylate and forty parts of isobutyl phthalate are mixed and a small amount of benzoyl peroxide added. This mixture is poured into a cell 5 mm. wide and heated to 70° C. until polymerization is complete. After cooling a slab 5 mm. thick is obtained.

*Example 2.*—A mixture of fifty parts of ethyl methacrylate, twenty-five parts of methyl acrylate and twenty-five parts of isobutyl phthalate, containing a small amount of benzoyl peroxide is poured into cells 10 mm. wide and heated to 70° C. When the polymerization is complete a slab 10 mm. thick is obtained.

*Example 3.*—A mixture of seventy parts of vinyl acetate and thirty parts of isobutyl phthalate, with a small amount of benzoyl peroxide is placed in a cell 5 mm. wide and polymerized as in Example 1.

*Example 4.*—Monomeric ethyl methacrylate is polymerized as in Example 1, in a cell 5 mm. wide. The resulting slab is perfectly free of bubbles and distortions.

This process is also applicable to other liquid materials which are converted by heating to solids, as for example phenolformaldehyde resins, etc.

In some instances it is advantageous to coat the walls of the cell with a material which will prevent the polymerized slab from adhering too firmly to the walls. Furthermore bags or sacks of the proper dimensions to fit snugly in the cell may be used. These bags are placed in the cell and filled with the monomeric material. The top of the bag is then folded over so as to make a nearly vapor tight closure. The cell and contents are then heated as described above until polymerization is completed. The finished slab with the sack can then be removed and the sack taken off. In many cases it will be advantageous to leave the slab in the sack for protection against dust, abrasion, etc. during shipment. The sack can then be removed immediately prior to using the slab. Many materials may be used for making the sacks as well as for lining the cell. For the latter, viscose, glue, gelatine, etc. have been found satisfactory and for the former, films of regenerated cellulose, glue or gelatine or paper impregnated with these materials or others which will permit the sack to fill out the cell completely and at the same time be impervious to the monomeric liquid within.

The slabs made by this process can be used for many purposes where a bubble-free product is required. Safety glass for example, can be made by placing a slab 32 x 16 x 1 cm. between two glass sheets 100 x 50 cm. and subjecting this assembly to heat and pressure. The polymerized material will flow out to a thinner sheet and completely fill the space between the glass sheets, leaving the intermediate film free of bubbles and adhering firmly to both sheets of glass.

The slabs may be used as such for a glass substitute particularly where light weight and non-shatterability are essential as for instance in aeroplanes and dirigibles.

By pressing the slabs between metal plates thinner sheets of any desired thickness may be easily made.

The rods of any desired cross-section can be cut into discs and then pressed to form lenses or used between small glass discs or lenses for making goggles, etc.

I claim:

1. A process for the production of relatively thin bubble free slabs from polymerizable derivatives of acrylic and methacrylic acid capable of forming rigid polymers, which comprises polymerizing said compounds in narrow cells, the walls of which are uniformly heated and maintained at a polymerizing temperature by a circulating fluid, the temperature of which is regulated to conduct away heat generated during polymerization, whereby overheating of the polymer is prevented.

2. A process for the production of relatively thin bubble free slabs from polymerizable derivatives of acrylic and methacrylic acid capable of forming rigid polymers, which comprises polymerizing said compounds in narrow, vertical cells, of which the two walls of greatest area are uniformly maintained at a temperature of approximately 70° C.

3. A process for the production of relatively thin bubble free slabs from polymerizable derivatives of acrylic and methacrylic acid capable of forming rigid polymers, which comprises placing said compounds in a sack of a material impervious to said compounds, and heating said sack and polymerizable derivatives of acrylic and methacrylic acid in a narrow cell, of which the two walls of greatest area are uniformly heated and maintained at a polymerizing temperature by a circulating fluid, the temperature of which is regulated to conduct away heat generated during polymerization, whereby overheating of the polymer is prevented.

4. A process for the production of relatively thin bubble free slabs from ethyl methacrylate, which comprises polymerizing said compound in narrow cells, and the walls of which are uniformly heated and maintained at a polymerizing temperature by a circulating fluid, the temperature of which is regulated to conduct away heat generated during polymerization, whereby overheating of the polymer is prevented.

5. A process for the production of relatively thin bubble free slabs from ethyl methacrylate, which comprises polymerizing said compound in narrow, vertical cells, of which the two walls of greatest area are uniformly maintained at a temperature of approximately 70° C.

6. A process for the production of relatively thin bubble free slabs from ethyl methacrylate, which comprises placing said compound in a sack of a material impervious to said compound, and heating said sack and compound in a narrow cell, of which the two walls of greatest area are uniformly heated and maintained at a polymerizing temperature by a circulating fluid, the temperature of which is regulated to conduct away heat generated during polymerization, whereby overheating of the polymer is prevented.

OTTO RÖHM.